Oct. 4, 1932.  F. W. MEDAUGH  1,881,213
FLUID PRESSURE METER
Filed Aug. 14, 1928

F. W. Medaugh
Inventor
J. S. Dowling
Attorney

Patented Oct. 4, 1932

1,881,213

UNITED STATES PATENT OFFICE

FREDERICK W. MEDAUGH, OF BALTIMORE, MARYLAND

FLUID PRESSURE METER

Application filed August 14, 1928. Serial No. 299,488.

This invention relates to certain new and useful improvements in fluid pressure meters, and has for its particular object the provision of an expansible member capable of being inserted in a fluid feed conduit so that the high and low pressures traveling through said conduit may be determined.

A further object of this invention is the provision of an expansible member carrying dual tubes, which permit the member to be inserted in a fluid carrying conduit, so that the high and low pressures of said fluid may be easily and quickly determined.

A still further object of this invention is to provide an expansible member provided with tubes, to which any common recording apparatus may be attached, so that the high and low pressures of fluids traveling through pipes or conduits may be ascertained.

Another important object of this invention is the provision of an expansible member capable of being inserted through a by-pass into a fluid conducting pipe, self-expanding after its insertion by action of the fluid therein, and tubes carried by said member whereby the high and low pressures of the fluid in the conduits or pipes may be determined or recorded, if desired.

With these and other objects in view, the invention consists in certain novel features, combination and arrangement of parts as will be hereinafter more fully described, illustrated in the accompanying drawing, and claimed.

Figure 1:
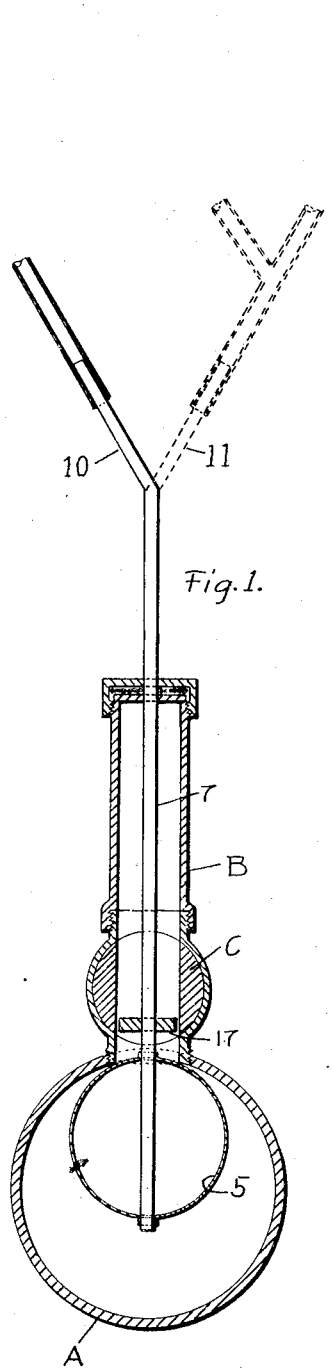
Figure 1 is an assembly view with the conduit and its by-pass in cross section, illustrating my improved invention applied thereto.
Figure 2:
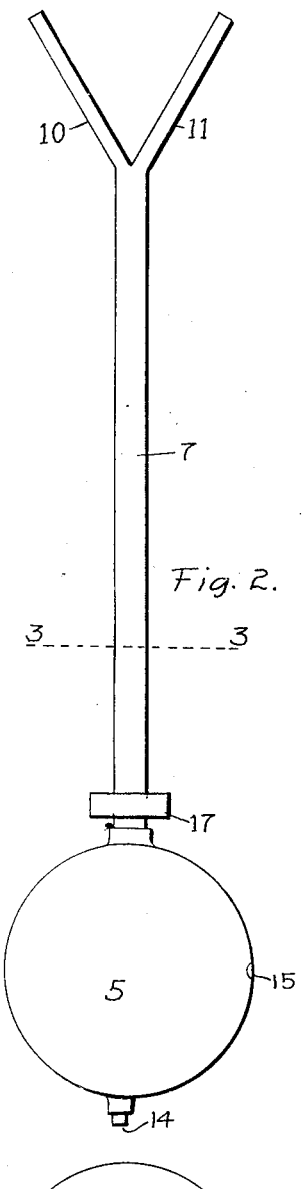
Figure 2 is a side elevational view of my improved fluid pressure meter.
Figure 3:
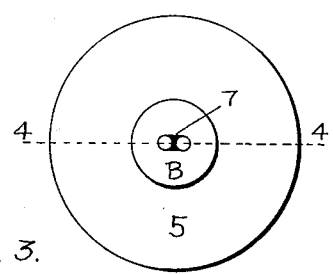
Figure 3 is a transverse sectional view, taken on the line 3—3 of Figure 2.
Figure 4:
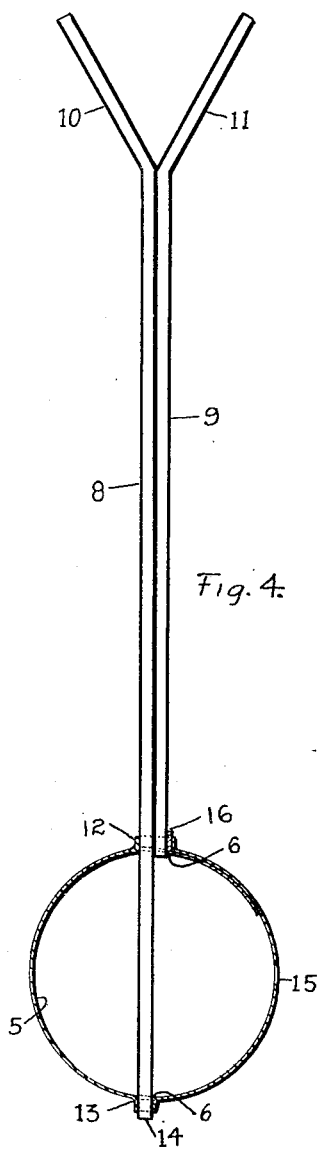
Figure 4 is a vertical sectional view, taken on the line 4—4 of Figure 3.

Referring to the drawing, the numeral 5 indicates an expansible member of my improved fluid pressure meter, and it is constructed of any materials found suitable for the purpose. It is to be understood that this member can be of various sizes and shapes, the particular design thereof forming no part of the invention. It has, however, been found practical to make this member in the form of a sphere.

The member 5 is provided with a pair of diametrically opposed openings 6, in which is secured one end of a dual tube 7, and this tube constitutes a supporting and positioning means for the member 5.

The dual tube 7 is the means whereby the member 5 may be arranged in a conduit or pipe "A", through a suitable by-pass "B", controlled by a valve "C", and this tube 7 has dual passages 8 and 9, respectively, the passage 8 constituting a low pressure passage and the passage 9 constituting a high pressure passage, as will be hereinafter more fully described.

The upper end of said tube 7 is divided into separate branches 10 and 11, respectively, and this provides means whereby a suitable recording apparatus may be attached to the tube to record the readings of the pressure in the conduit or pipe "A".

The lower end of said tube is inserted in and connected to the wall of one of the openings 6, as at 12, and this tube has its high pressure passage terminating slightly beyond this opening on the interior of said member 5, while the low pressure passage of the tube is continued downwardly and extends through and beyond the diametrically opposed opening 6 and is connected thereto, as at 13. The extreme terminal of the low pressure passage 8 of the tube 7, extends beyond the plane of the member 5 and constitutes a low pressure reading point 14.

The member 5 is provided in its wall with an opening 15, which is located equally distant from the attached points of the tube 7 with said member, and this opening 15 communicates with the interior of said member, permitting the same to be inflated and at the same time cooperates with the passage 9 on which may be attached a reading meter to constitute a high pressure meter, so that high pressure in the conduit "A" may be easily and quickly ascertained.

Due to the expansion and contraction of the member 5, it may be found necessary to reenforce the latter at its point of connection 12, and to do so there is provided a metal plate 16, which is interposed between the tube and member 5 to the upper opening 6 and is arranged slightly within the member 5 and has contact therewith to protect the latter from complete collapsing on its initial insertion into a conduit or pipe "A".

It is understood that when the member 5 is positioned in a conduit or pipe "A", the opening 15 is arranged to face the inward flow of fluid. By such positioning, the member 5 is immediately inflated and the high pressure of said fluid may be ascertained. When the member 5 is so positioned, it locates the opening 14 in such a position as to permit the readings of the low pressure by virtue of attaching to the branch 10 a similar reading meter or the like, as attached to the branch 9.

To provide a reenforcing means for the tube 7 and member 5, I provide a plate 17, which is supported around said tube 7 adjacent its initial connection with the member 5. This plate 17 acts as a guide for the tube 7 when inserted in a by-pass prior to its entrance into a pipe or conduit "A". It will always materially assist in preventing distortion or bending of the tube 7, incident to pressure striking the member 5.

Having thus described my invention, what I claim as new is:

In a fluid pressure meter of the class described, an expansible member having an opening in its wall, said member being also provided with a pair of diametrically opposed openings at right angles to the first named opening, a tube having dual passages secured in said second named openings of the member for supporting the latter thereto, one of said passages of the tube communicating with the interior thereof and the opposite passage arranged beyond the exterior surface of said member, said member being collapsible so as to be positioned in a conduit or pipe with the first named opening facing in the direction of the travel of the inflow fluid.

In testimony whereof I hereunto affix my signature.

FREDERICK W. MEDAUGH.